UNITED STATES PATENT OFFICE.

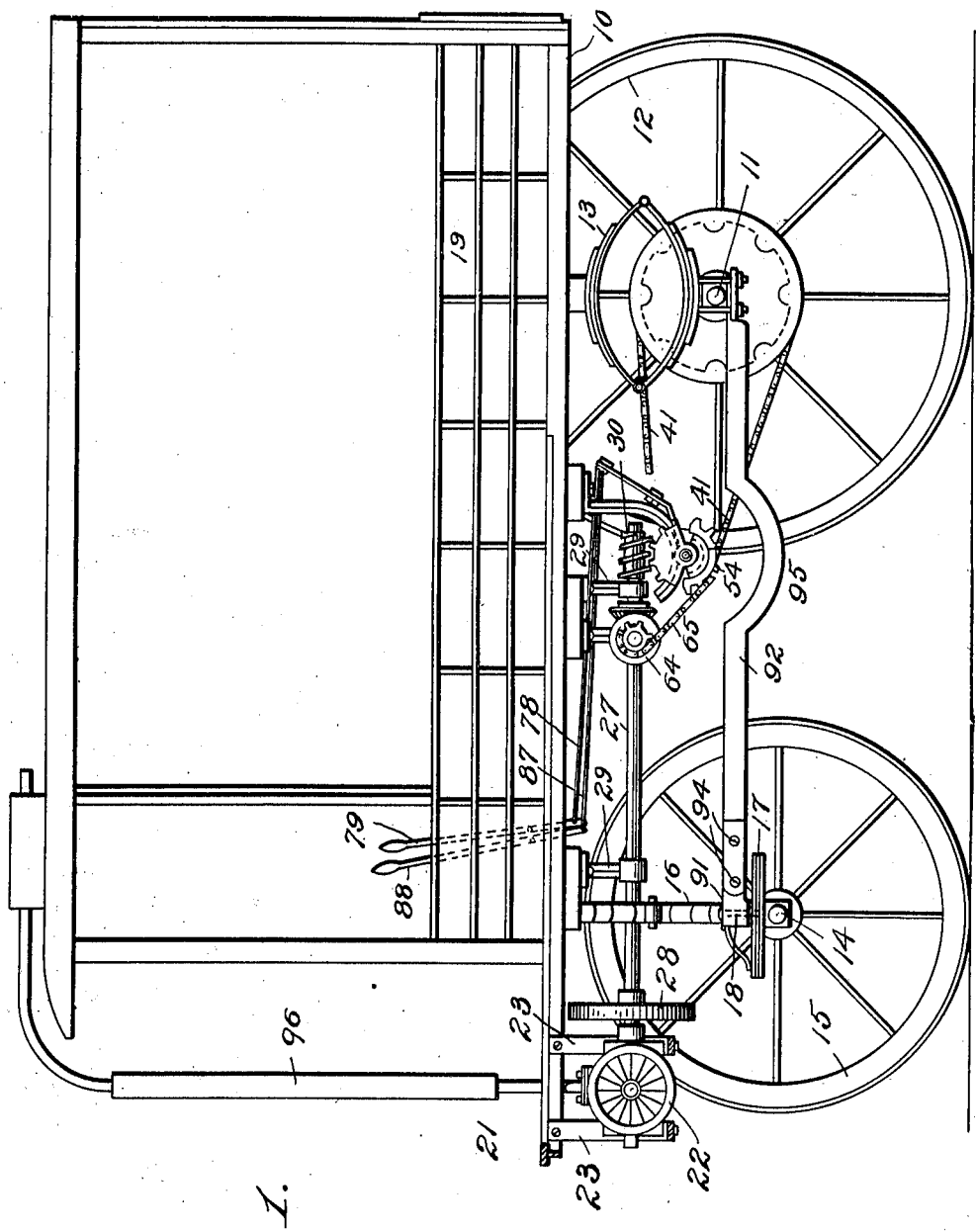

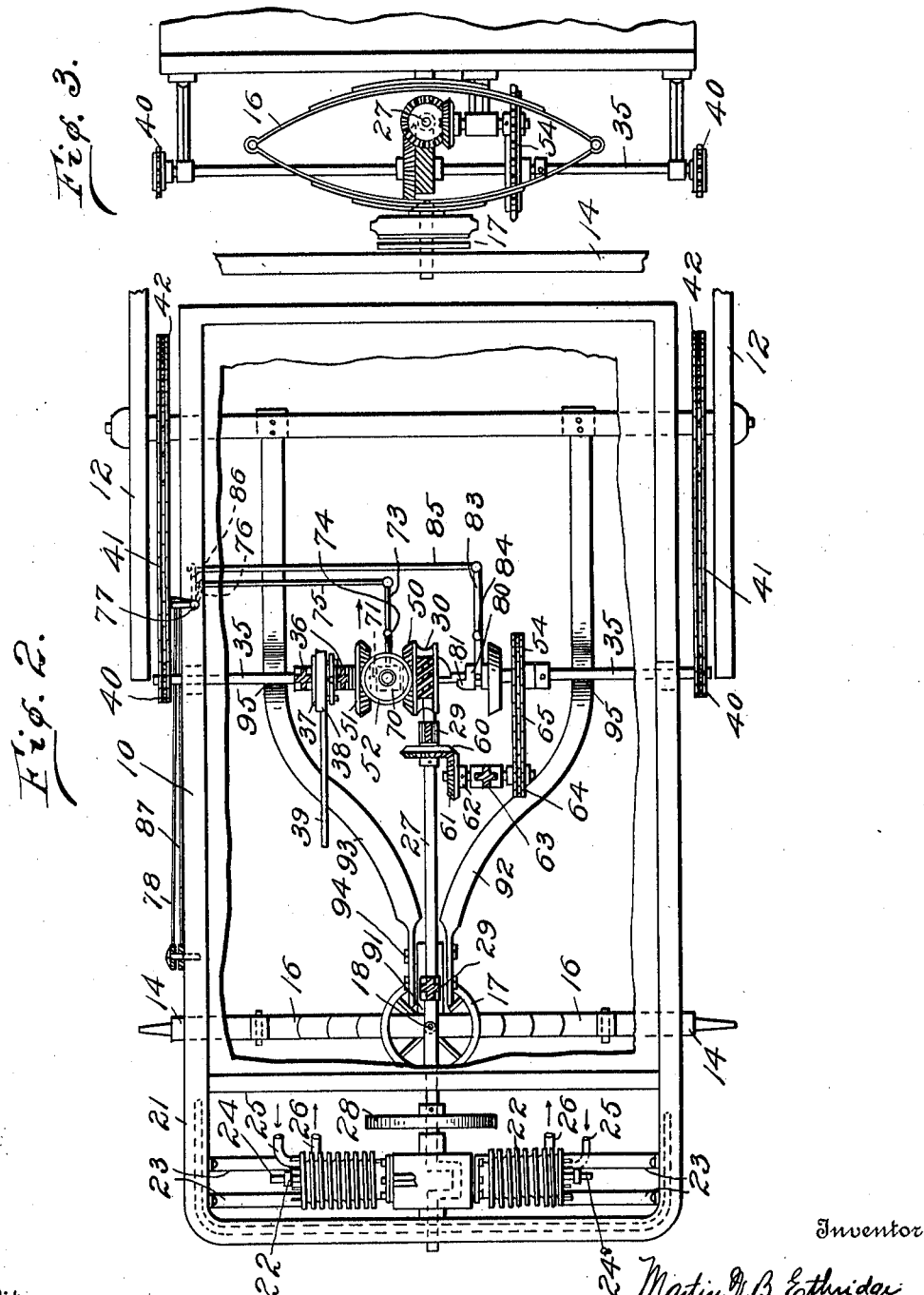

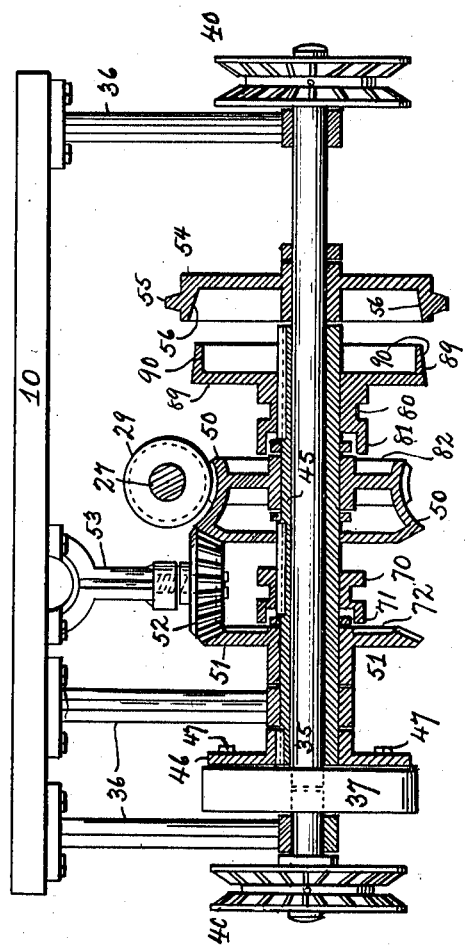

MARTIN V. B. ETHRIDGE, OF NEW YORK, N. Y.

AUTOMOBILE WAGON.

956,061.  Specification of Letters Patent.  Patented Apr. 26, 1910.

Application filed July 10, 1907. Serial No. 382,973.

*To all whom it may concern:*

Be it known that I, MARTIN V. B. ETHRIDGE, a citizen of the United States, and a resident of New York, in the county of New York and State of New York, have invented certain new and useful Improvements in Automobile Wagons, of which the following is a specification.

My invention relates to wagons and more particularly to forms of wagons designed to be used without horses and its novelty consists in the construction and adaptation of the parts, as will be more fully hereinafter pointed out.

The object of the invention is to take a wagon of a common type, known as the "three-spring" wagon and to equip it, with as little change as possible, with an automobile propelling rig.

The wagon itself comprises a suitable body, a non-rotatable rear axle with traction wheels revolving independently thereon, a non-rotatable front axle with similar traction wheels, two longitudinal elliptical springs intermediate the rear axle and the body and a transverse elliptical spring intermediate the front axle and the body. It includes also the usual fifth wheel and king bolt. It is difficult to equip such a wagon with an automobile rig because the elliptical front spring is in the way, the reach is in the way, the rear wheels, to which the traction is best applied, must be coupled together, means must be devised to apply at least two rates of speed forward and one rate backward to the wheels and the whole control must be located in parts readily accessible to the operator seated on the usual driver's seat. In brief, I accomplish the desired purpose by placing a motor under the foot board and having its shaft extend rearwardly under the body of the wagon through the front elliptical spring. This motor shaft terminates in front of a transverse shaft suitably supported in bearings under the wagon body, and which transverse shaft is connected to the rear wheels and adapted to drive them by means of two pulleys and a welded link chain connection, one of the simplest forms of mechanism known, one which does not get out of order easily, permits a slight freedom of movement and is strong, efficient and cheap. The transverse shaft is provided with an equalizing or equalization gearing and with a sleeve on which are loosely mounted a worm gear and a beveled gear. A sprocket wheel is loosely mounted on the shaft. These are continually rotated. The sprocket wheel is connected to the motor shaft through a counter shaft and moves at the same or a proportionate rate of speed. The worm gear and beveled gear are connected to the motor shaft through a worm which reduces the speed to a fraction of that of the motor shaft. An intermediate idler is interposed between the worm gear and beveled gear to reverse the motion of the latter. Clutches are keyed to the sleeve and are slidably mounted; one clutch throws the sprocket into engagement with the sleeve and shaft. This causes the traction wheels to revolve forward at high speed. The same clutch moved in the opposite direction throws the worm gear into engagement with the sleeve and causes the traction wheels to revolve forward at low speed. A third clutch throws the beveled gear into engagement with the sleeve and causes the traction wheels to revolve backward at low speed. These clutches are all operated by links and levers terminating in handles at the driver's seat. The wagon reach has to be removed to give room for this mechanism and I replace it by a forked reach which avoids the mechanism and is depressed to go around it. I also lead the exhaust pipes of the motor to the top of the wagon body so that the products of combustion shall not be discharged against the mechanism to their injury.

In the drawings, Figure 1 is a side elevation of a vehicle embodying my invention; Fig. 2 is a plan of the same below the plane of the wagon body, the latter being shown broken away to disclose the parts beneath; Fig. 3 is a front elevation of the parts beneath the wagon body, some of the parts being omitted, and Fig. 4 is a central section on an enlarged scale of the transverse shaft, some of the connected parts being shown in full line (the left side of the shaft itself not covered by the sleeve being omitted).

In the drawings, 10 is the body of an ordinary wagon of what is known as the "three-spring" type. It is provided with a non-rotatable rear axle 11 to which are secured in the usual manner, at each end, independently revoluble traction wheels 12. Elliptical springs 13 are interposed between the rear of the body and this axle in the usual manner. It is also provided with a non-rotatable front axle 14 to which are secured in the usual manner, at each end, independently revoluble traction wheels 15. An elliptical spring 16 is interposed between the axle 14 and the body 10 and it is provided with the usual fifth wheel 17 and king bolt 18. If desired, a frame 19 and canopy 20 may be secured to the body 10. The parts described form no part of my invention.

At the front of the wagon under the body, and preferably under the foot board 21, I place a motor indicated at 22, securing the same in position by means of a frame work 23, or any other suitable housing. The form of the motor is quite immaterial, but I have indicated an air cooled explosive gasolene engine; 24 being the wire to the plug—25 the intake and 26 the exhaust. Whatever kind of motor is employed, it is provided with a shaft 27 provided with a fly wheel 28, and extending rearwardly in a horizontal direction under the body of the wagon passing through the elliptical spring 16. It is supported by suitable hangers indicated at 29 and terminates in a worm 30 at a point about midway between the front and rear traction wheels.

Underneath the wagon body, also about midway between the wheels, is provided a transverse shaft 35 supported in bearings 36 depending from the wagon body. This shaft is hollow and is provided with an equalizing gear contained in a casing 37, this casing constituting a bearing for a brake band 38 operated by a rod 39 extending toward the front of the vehicle. A shaft of this character comprising an equalizing gearing is a well known commercial form in the art and needs no particular description.

At each end of the shaft 35 are secured driving sheaves 40, each provided with an annular groove to receive a welded link chain 41. These chains lead to and engage with similar larger sheaves 42 secured to the rear traction wheels 12.

The shaft 35 is provided with a long sleeve 45 adapted to rotate thereon, and which is secured to the equalizing gear by an annular bracket 46 in any suitable manner, for instance by bolts 47. Loosely mounted on the sleeve 45 and adapted to revolve thereon, are several other mechanical elements as follows: 50 is a worm gear meshing with the worm 29 on the motor shaft 27 and continually rotated thereby. 51 is a beveled revolving gear adapted to mesh with an idle beveled gear 52 mounted to revolve in a horizontal plane and the shaft of which is supported from the wagon body 10 by a suitable hanger 53. This idler 52 is in mesh with the worm gear 50 and consequently the rotation of the motor shaft through the worm 29, the gear 50 and the idler 52 is communicated continually to the beveled gear 51. 54 is a sprocket wheel in the form of a hollow frustum of a cone having externally projecting sprockets 55 and an inner beveled annular surface 56. This sprocket wheel receives its rotary motion from the motor shaft 27 through a miter gear 60 mounted thereon, a similar miter gear 61 mounted on a counter shaft 62 suspended from a hanger 63 secured to the body of the wagon, a sprocket wheel 64, secured to the counter shaft, and a chain 65 which drives the wheel 54. Keyed to slide on the sleeve 45, and rotating with it, are a number of clutches adapted to couple the shaft 35 to the motor shaft in different ways according to the exigencies of the use of the device.

70 is a clutch provided with external projecting teeth 71 adapted to contact and engage with a rib 72 on the reversing gear 51. In order to insure such engagement the clutch is moved toward the left (in Fig. 4) by means of a lever 73 swinging on a pivot 74 and connected by a link 75 to a bell crank lever 76, swinging on a piviot 77 and actuated by a connecting rod 78 provided with a handle 79 at the front of the machine.

The worm and worm gear are made of such proportions that the motor shaft turns twelve times to one revolution of the gear. Therefore coupling the traction wheels and worm gear together produces a backward rotation of the shaft at low speed. The motion of the motor shaft, reduced by its transmission through the worm gear, is transmitted to the traction wheels to drive them at low speed forward by means of a clutch 80, provided with teeth 81 adapted to engage a rib 82 on the wheel 50. This clutch is moved toward the left (in Fig. 4) by means of a lever 83 swinging on a pivot 84 and connected by a link 85 to a bell crank 86 swinging on the pivot and connected by a link 87 with a handle 88 at the front of the vehicle.

The full motion or high speed of the motor is communicated to the traction wheels through the miter gears 60 and 61, the counter shaft 62 and the sprocket wheels 64 and 54 by means of the clutch 80 when it is slid to the right by means of the handle 88 and lever connections described in the last paragraph. To that end the clutch is provided with a friction cone 89, the entire surface of which 90 is adapted to engage with the inner surface 56 of the sprocket wheel 54. So that by pushing the lever 88 one way the traction wheels are driven at low speed forward; by pushing it the other way they are driven at high speed forward; and by pushing the lever 79 they are driven at low speed backward.

As the ordinary wagon reach connecting the king bolt and rear axle would be in the way of the transverse shaft and the motor shaft, I remove it and replace it by a reach of peculiar design especially adapted for the purpose. It comprises a block 91 secured to the king bolt in the usual manner and two forks 92 and 93 made integral therewith, or secured thereto by suitable means, as bolts 94. These forks extend rearwardly and are fastened to the rear axle. They are each provided with a depression 95 to make room for the transverse shaft and gearing.

A pipe 96 leads from the exhaust of the motor to the top of the wagon frame so as to discharge the products of combustion away from the parts liable to be affected thereby.

What I claim as new is:—

1. A vehicle, a transverse shaft extending across the same and interrupted by an equalizing gearing, a sleeve external to the shaft and normally at rest and connected to the equalizing gearing whereby power transmitted to the sleeve at any point is conducted to the shaft at all points, a motor shaft, a worm actuated thereby, a worm gear loosely mounted on the sleeve and meshing with the worm, a sprocket wheel loosely mounted on the transverse shaft, an operating connection between the motor shaft and the sprocket wheel, a clutch slidably mounted on the sleeve and adapted to be thrown into engagement with the worm gear, to move the transverse shaft at slow speed forward and to be thrown into engagement with the sprocket wheel to move the transverse shaft at high speed forward at the will of the operator.

2. A vehicle, a transverse shaft extending across the same and interrupted by an equalizing gearing, a sleeve external to the shaft and normally at rest and connected to the equalizing gearing, whereby power transmitted to the sleeve at any point is conducted to the shaft at all points, a motor shaft, a worm actuated thereby, a worm gear loosely mounted on the sleeve and meshing with the worm, a sprocket wheel loosely mounted on the transverse shaft, an operating connection between the motor shaft and the sprocket wheel, a clutch slidably mounted on the sleeve and adapted to be thrown into engagement with the worm gear to move the transverse shaft at slow speed forward and to be thrown into engagement with the sprocket wheel to move the transverse shaft at high speed forward at the will of the operator, and means for moving the clutch to secure either speed comprising a single lever provided with a handle at the front of the vehicle.

3. A vehicle, a transverse shaft extending across the same and interrupted by an equalizing gearing, a sleeve external to the shaft and normally at rest and connected to the equalizing gearing whereby power transmitted to the sleeve at any point is conducted to the shaft at all points, a motor shaft, a sprocket wheel and a worm gear loosely mounted on the transverse shaft, an operating connection between the motor shaft, the worm gear, and the sprocket wheel, a clutch slidably mounted on the sleeve and comprising a tooth adapted to engage with the worm gear on its one side, and a friction cone adapted to engage internally with the sprocket wheel on its other side.

4. A vehicle, a transverse shaft extending across the same and interrupted by an equalizing gearing, a sleeve external to the shaft and normally at rest and connected to the equalizing gearing whereby power transmitted to the sleeve at any point is conducted to the shaft at all points, a motor shaft, a worm actuated thereby, a worm gear loosely mounted on the sleeve and meshing with the worm, a sprocket wheel loosely mounted on the transverse shaft and made in the form of the hollow frustum of a cone, an operating connection between the motor shaft, and the sprocket wheel, a clutch slidably mounted on the sleeve and provided with a tooth adapted to engage the worm gear, and a friction cone adapted to engage the inner surface of the sprocket wheel and means for moving the clutch on the sleeve to engage either the worm gear or the sprocket wheel at the will of the operator.

5. A vehicle, a transverse shaft extending across the same and interrupted by an equalizing gearing, a sleeve external to the shaft and normally at rest and connected to the equalizing gearing whereby power transmitted to the sleeve at any point is conducted to the shaft at all points, a motor shaft, a worm actuated thereby, a worm gear loosely mounted on the sleeve and meshing with the worm, a sprocket wheel loosely mounted on the transverse shaft, and made in the form of the hollow frustum of a cone, an operating connection between the motor shaft and the sprocket wheel, a clutch slidably mounted on the sleeve and provided with a tooth adapted to engage the worm gear, and a friction cone adapted to engage the inner surface of the sprocket wheel, and means for moving the clutch on the sleeve to engage either the worm wheel or the sprocket wheel at the will of the operator, said means comprising a lever provided with a handle at the front of the vehicle.

6. A vehicle, a transverse shaft extending across the same and interrupted by an equalizing gearing, a sleeve external to the shaft and normally at rest and connected to the equalizing gearing whereby power transmitted to the sleeve at any point is conducted to the shaft at all points, a motor shaft, a worm actuated thereby, a worm gear loosely mounted on the sleeve and meshing with the worm, a sprocket wheel loosely mounted on the transverse shaft, and made in the form of the hollow frustum of a cone, an operating connection between the motor shaft and the sprocket wheel, consisting of a beveled gear on the motor shaft, a counter shaft, a beveled gear thereon meshing with the gear on the motor shaft whereby the countershaft is turned, a sprocket wheel turning with the countershaft and a chain between said sprocket wheel and the sprocket wheel on the transverse shaft, a clutch slidably mounted on the sleeve and provided with a tooth adapted to engage the worm gear, and a friction cone adapted to engage the inner surface of the sprocket wheel, and means for moving the clutch on the sleeve to engage either the worm gear or the sprocket wheel at the will of the operator.

7. A vehicle, a transverse shaft extending across the same and interrupted by an equalizing gearing, a sleeve external to the shaft and normally at rest and connected to the equalizing gearing whereby power transmitted to the sleeve at any point is conducted to the shaft at all points, a motor shaft, a worm actuated thereby, a worm gear loosely mounted on the sleeve and meshing with the worm, a sprocket wheel loosely mounted on the transverse shaft and made in the form of the hollow frustum of a cone, an operating connection between the motor shaft and the sprocket wheel, consisting of a beveled gear on the motor shaft, a counter shaft, a beveled gear thereon meshing with the gear on the motor shaft whereby the countershaft is turned, a sprocket wheel turning with the countershaft and a chain between said sprocket wheel and the sprocket wheel on the transverse shaft, a clutch slidably mounted on the sleeve and provided with a tooth adapted to engage the worm gear and a friction cone adapted to engage the inner surface of the sprocket wheel, and means for moving the clutch on the sleeve to engage either the worm gear or the sprocket wheel at the will of the operator, said means comprising a lever provided with a handle at the front of the vehicle.

8. A vehicle, a transverse shaft extending across the same and interrupted by an equalizing gearing, a sleeve external to the shaft and normally at rest and connected to the equalizing gearing whereby power transmitted to the sleeve at any point is conducted to the shaft at all points, a motor shaft, a worm actuated thereby, a worm gear loosely mounted on the sleeve and meshing with the worm, a sprocket wheel loosely mounted on the transverse shaft, an operating connection between the motor shaft and the sprocket wheel, a reversing gear, a clutch slidably mounted on the sleeve and adapted to be thrown into engagement with the worm gear to move the transverse shaft at slow speed forward and to be thrown into engagement with the sprocket wheel to move the transverse shaft at high speed forward, a second clutch slidably mounted on the sleeve, means for moving it into engagement with the reversing gear whereby the power of the motor shaft is communicated to said gear through the worm gear, and thence to the sleeve to move the transverse shaft at slow speed backward.

9. A vehicle, a transverse shaft extending across the same and interrupted by an equalizing gearing, a sleeve external to the shaft and normally at rest and connected to the equalizing gearing whereby power transmitted to the sleeve at any point is conducted to the shaft at all points, a motor shaft, a worm actuated thereby, a worm loosely mounted on the sleeve and meshing with the worm, a sprocket wheel loosely mounted on the transverse shaft, a reversing gear, and an idler associated with the sleeve, an operating connection between the motor shaft and the sprocket wheel, a clutch slidably mounted on the sleeve and adapted to be thrown into engagement with the worm gear to move the transverse shaft at slow speed forward and to be thrown into engagement with the sprocket wheel to move the transverse shaft at high speed forward, a second clutch slidably mounted on the sleeve, means for moving it into engagement with the reversing gear whereby the power of the motor shaft is communicated to said gear through the worm gear and idler, and thence to the sleeve to move the transverse shaft at slow speed backward, such means comprising a second lever provided with a handle located near the front of the vehicle.

10. In a vehicle, the combination with a vehicle body and supporting wheels therefor, of a driving shaft having a worm, a driven shaft connected to the supporting wheels, a sleeve journaled on the driven shaft and connected thereto, a worm gear loosely journaled on the sleeve and meshing with the worm, a sprocket wheel loosely journaled on the driven shaft, a countershaft having a sprocket wheel, a sprocket chain connection between the sprocket wheels, a beveled gear connection between the driving shaft and countershaft, and a clutch member located on the sleeve between the worm gear and sprocket wheel and movable alternately into engagement therewith to connect the same to the sleeve.

11. In a vehicle, the combination with the vehicle body and supporting wheels therefor, of a rotatable driving member, a rotatable driven member disposed at an angle thereto and geared to the supporting wheels, a gear element loosely journaled on the driven member and directly connected to the driving member, a second gear element loosely journaled on the driven member and geared to the first gear element, a third gear element loosely journaled on the driven member and indirectly geared to the driving member, and means for separately connecting the different gear elements to the driven member.

12. In a vehicle, the combination with the vehicle body and supporting wheels therefor, of a driving shaft having a worm, a driven member including a shaft and a sleeve, said member being geared to the supporting wheels, a worm gear loosely journaled on the sleeve and meshing with the worm, a beveled gear wheel loosely journaled on the sleeve and geared to the worm gear, a sprocket wheel loosely journaled on the driven shaft and geared to the driving shaft, and clutch mechanism for connecting the worm gear, the beveled gear, and the sprocket wheel separately to the sleeve.

Witness my hand this 5th day of July 1907, at the city of New York, in the county and State of New York.

MARTIN V. B. ETHRIDGE.

Witnesses:
HERMAN MEYER,
ALAN McDONNELL.